March 3, 1964

W. M. KENDRICK 3,122,919

CAPACITIVE PRESSURE GAGE

Filed Sept. 14, 1961

INVENTOR.
Webster M. Kendrick
BY
S. J. Rotondi, A. J. Dupont & J. P. Goode

March 3, 1964 W. M. KENDRICK 3,122,919
CAPACITIVE PRESSURE GAGE
Filed Sept. 14, 1961 2 Sheets-Sheet 2

INVENTOR.
Webster M. Kendrick
BY
S. J. Rotondi, A. J. Dupont & F. D. Goode

United States Patent Office 3,122,919
Patented Mar. 3, 1964

3,122,919
CAPACITIVE PRESSURE GAGE
Webster M. Kendrick, Baltimore, Md., assignor to the United States of America as represented by the Secretary of the Army
Filed Sept. 14, 1961, Ser. No. 138,205
7 Claims. (Cl. 73—167)
(Granted under Title 35, U.S. Code (1952), sec. 266)

The invention described herein may be manufactured by or for the Government of the United States of America for governmental purposes without the payment of royalties thereon.

This invention relates to gages and more particularly to a capacitance-type pressure gage.

A broad object of this invention is to provide a pressure responsive gage and recording system.

A more specific object of this invention is to provide a system for measuring the pressures applied to the base of a projectile during test firings of experimental propellants.

Another object of the invention is to provide a pressure gage which can be mounted in a projectile to measure the chamber and barrel pressures in a gun during firing.

Yet another object is to provide a pressure gage which is insensitive to acceleration forces experienced during firing of the projectile.

Still another object is to provide a gage which functions by changing the capacitance of an air gap contained therein.

A further object of this invention is to provide a pressure gage which is substantially immune to shock and vibration forces during the firing of the gun.

Other objects and advantages of the invention will hereinafter become more fully apparent from the following description of the annexed drawing which illustrates two embodiments of the invention and wherein.

Figure 1:
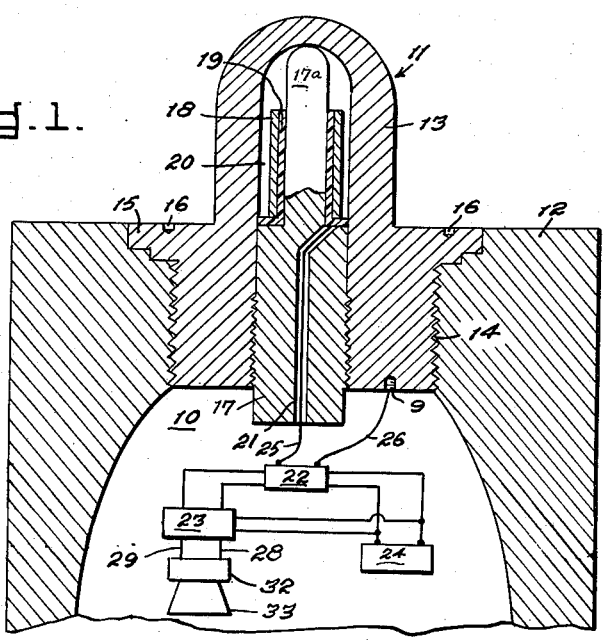
FIGURE 1 shows a cross-sectional view of the preferred embodiment of the gage mounted on the base of a projectile.

Referring now in greater detail to the drawing wherein like reference characters designate like or corresponding parts throughout the several views, there is shown in FIGURE 1 a capacitive pressure gage 11 having an outer cylindrical bell-shaped body 13 with a threaded lower portion 14 for engagement with the base of the projectile casing 12. Disposed adjacent the terminal end of the aforesaid threaded portion 14 is a protruding circular flange 15 apertured at 16 to receive an appropriate spanner wrench (not shown).

Bell-shaped body 13 is provided with a cylindrical cavity along its longitudinal axis. Threadedly secured into this cavity is a cylindrically shaped body 17 having an upper portion 17a which is turned down to a diameter substantially less than that of the cavity. Surrounding portion 17a is a cylinder 18 of electrically conductive material. Interposed between portion 17a and cylinder 18 is a cylindrical filler 19 of epoxy resin or other suitable electrically non-conductive material. Between the outer surface of cylinder 18 and the cavity wall of body 13 is a minute but uniform air-gap 20.

Body portion 17 contains a passageway 21 extending from the lower peripheral surface of 17a through body 17 so as to communicate with projectile cavity 10.

Contained within cavity 10 is a miniaturized transistor circuit consisting of an oscillator 22, an amplifier 23, a power supply 24 and a modulator 32 connected to an antenna 33. These miniature elements are interconnected with one another in a manner which will be described in greater detail in relation to FIGURE 3. The capacitive pressure gage 11 is connected to the oscillator 22 by means of two insulated electrical conductors or leads 25 and 26. The conductor 25 connects cylinder 18 to the oscillator 22 through passage way 21 while the second conductor 26 is connected to the body 17 of the capacitor by a screw means 9. The amplifier output is connected through insulated electrical conductors 28 and 29 to the modulator 32 and antenna 33.

Figure 3:
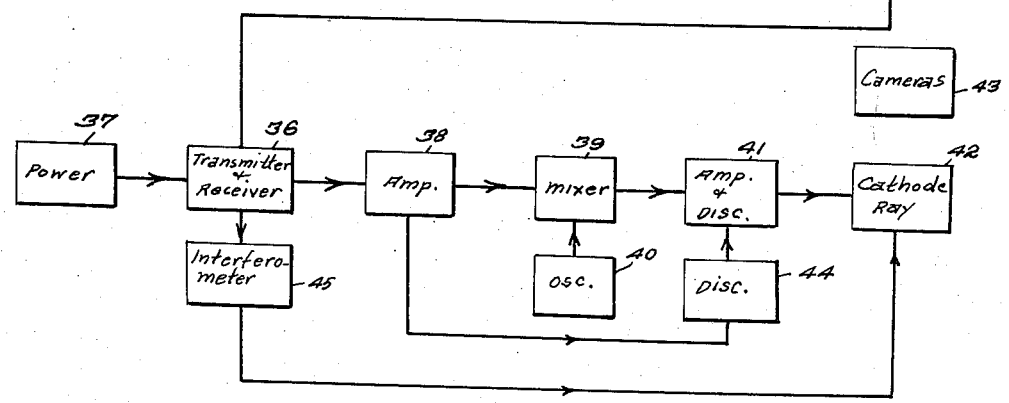
FIGURE 3 illustrates the electrical circuit of the transistor circuit components within the projectile.
Figure 3:
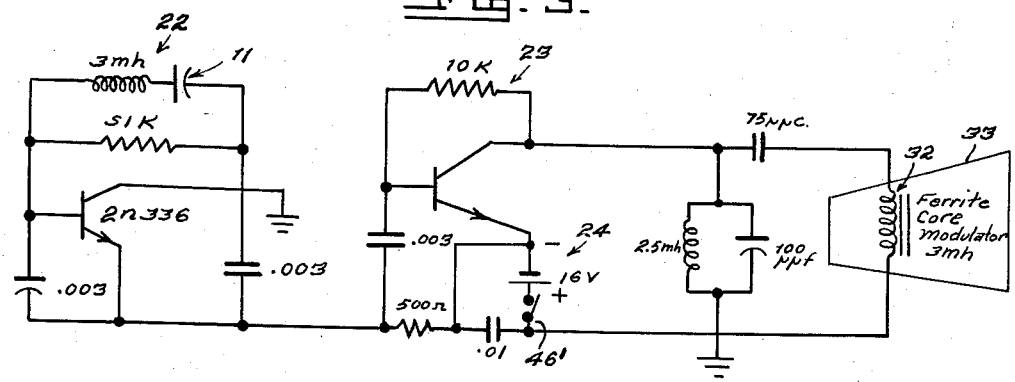

Referring to FIGURE 3, there is shown in greater detail the arrangement and electrical connections of the miniaturized transistor circuit. The capacitive pressure gage 11 is shown interconnected into a transistorized version of a Clapp oscillator 22. Connected to the oscillator is a transistor amplifier 23 which utilizes a high gain, high current capacity type transistor of the diffused or mesa type. Connected to the output of the amplifier is a ferrite modulator 32 which is operatively associated with a microwave horn antenna 33 of conventional design.

Figure 4:
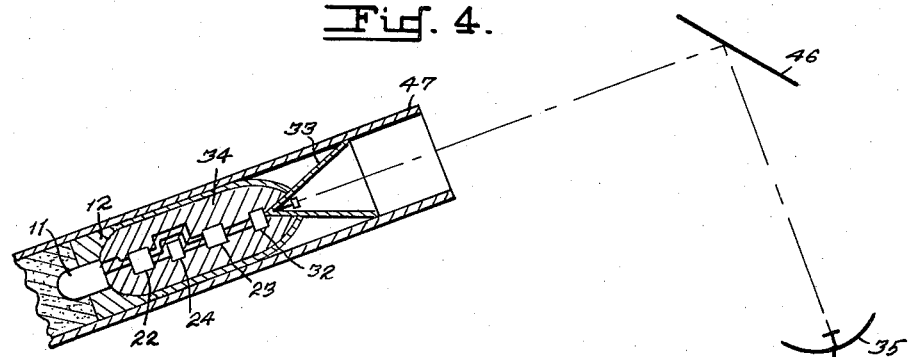
FIGURE 4 illustrates a block diagram showing both the interior and exterior electrical components associated with the gage.

In FIGURE 4 the entire transistor circuit is shown immersed in a rigid potting compound 34 within the projectile casing 12. The recording system is also shown in FIGURE 4 and consists of a transmitting and receiving antenna 35 connected to a transmitter and receiver unit 36. Power is furnished to the unit 36 by power supply means 37. Connected to the output of the receiver portion of unit 36 is an amplifier 38 which in turn is connected to a mixer 39 which has an oscillator 40 connected thereto. To the output of the mixer is connected a second amplifier 41 which drives a suitable recording device 42 such as a cathode ray oscilloscope. A high speed, open-shutter camera 43 is provided to record the information appearing on the face of the oscilloscope if such should be desirable. A plurality of these oscilloscopes and cameras may be arranged into banks if additional recording and viewing means are found necessary. A discriminator 44 is connected between the amplifier 38 and the amplifier 41 and connected to the cathode ray oscilloscope 42 is an interferometer 45. The use of the discriminator and interferometer will be described in greater details hereinafter.

The operation of the capacitive pressure gage and recording system is substantially as follows. A projectile containing a capacitance pressure gage 11 and its associated transistor circuit is loaded into the breech of a gun. The transistor circuit is then turned on by closing the switch 46′ of the circuit by appropriate means (not shown). With power applied to the circuit, the oscillator portion 22 begins to operate thus applying a signal through the amplifier 23 to the ferrite core modulator 32. The transmitter and receiver unit 36 is then turned on so that a signal may be both received and transmitted by the antenna 35. The transmitted signal from the antenna 35 is directed to a sheet of aluminum 46 which reflects the signal down the gun tube 47. This reflected signal is amplitude modulated by the ferrite modulator 32 in substantially the following manner. The signal from the oscillator 22 is first amplified by unit 23 and then applied to the modulator 32. This oscillating signal will cause the reflection coefficient of the ferrite modulator to vary in a manner well known in the art. Since the ferrite modulator is located in and forms a part of the microwave horn 33, the signal received and reflected back up the gun tube by the microwave horn will be modulated in accordance with the signal applied to the ferrite modulator. Thus a modulated signal is reflected by the microwave horn 33 from the projectile to the aluminum foil 46 and from there to the antenna 35 where it is then fed into the receiver portion of unit 36. The detected sub-carrier signal from the receiver portion of the unit 36 is filtered and amplified by the amplifier 38 and then fed to the mixer 39. Here the detected sub-carrier signal is mixed with a signal from the oscillator 40 and the resulting intermediate frequency signal is further amplified and filtered by the amplifier 41. The output from the amplifier 41 is applied to the cathode ray oscilloscope 42 where it is presented in display form. If the output information appearing on the cathode ray oscilloscope 42 is to be preserved for future study, the high speed, open-shutter camera 43 is used.

The frequency of the oscillator 22 and thereby the frequency of the modulated signal received by the receiver unit 36 is determined by the capacitance value of the pressure gage 11. This capacitance value will change when the gun is fired since the chamber pressure applied against the base of the projectile (and thereby the gage) will increase and exert a compressive force on the bell-shape portion 13 (FIGURE 1) of the capacitor thereby deforming its walls inwardly. Such deformation has the effect of decreasing the width of the air gap 20 and accordingly changing the capacitance thereof to a new value which is reflected by a change in the resonant frequency of the oscillator 22.

As the gun chamber pressure varies and the projectile begins its forward movement along the gun tube 47, the reflected signal from the horn 33 will be continuously modulated. This modulation is due to the change in the resonant frequency of oscillator 22 caused by the change in the capacitance of the air gap. These changes in the modulated signal will be picked up by the receiver unit 36 and compared to predetermined known signal produced by a known amount of pressure exerted upon the gage. By this procedure, it may be seen that the variations in pressure appearing at the base of the projectile can be determined for any given time or location.

For recording those instances where exceedingly fast pressure changes occur, an additional recording is made of the signal appearing at the mixer 39 before it is applied to the amplifier 41. In addition, to increase the reliability of the system, the signal from amplifier 38 is recorded after demodulation by a discriminator 44.

Figure 2:
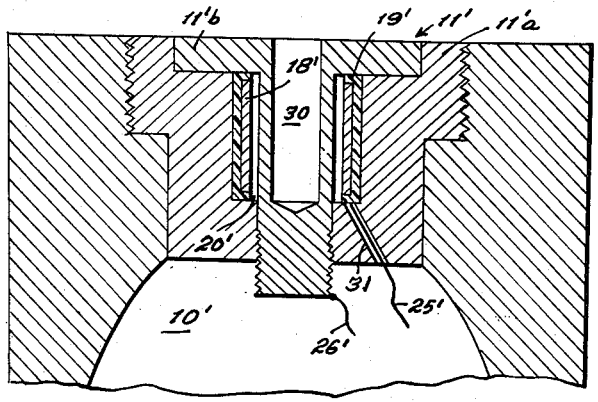
FIGURE 2 shows a cross-sectional view of an alternative embodiment.

Shown in FIGURE 2 is an alternative embodiment of the instant capacitance gage 11' threadedly engaged with a projectile base 12. Gage 11' is comprised of an outer portion 11'a and an inner portion 11'b. Disposed intermediate the ends of portion 11'a is an annular recess containing an electrically conductive cylinder 18' separated at all points from portion 11'a by a filler 19' of epoxy resin or other suitable electrically non-conductive material. The inside diameter of cylinder 18' is of slightly greater dimension than the corresponding outside diameter of portion 11'b thereby providing an air gap 20'. Portion 11'b also contains an axial cavity 30 which has a depth corresponding to the full length of air gap 20'.

Connected to cylinder 18' is one end of insulated lead 25' passing through passageway 31 into the projectile cavity 10'. Insulated lead 26', located within cavity 10' has one end thereof connected to portion 11'b. The other ends of leads 25' and 26', respectively, are connected to an oscillator as shown above.

In operation, the embodiment of FIG. 2 operates on the principle that the gun chamber pressure will be exerted against the walls of cavity 30 thereby displacing them outwardly so as to alter the capacitance of air gap 20', and accordingly changing the resonant frequency of the oscillator, as heretofore described.

Thus it can be seen that in utilizing either of the gage structures described, this invention provides a means for accurately measuring the internal pressures of a gun tube thus fulfilling a recognized need which has long existed in the field of interior ballistics. It is of course understood that the sensitivity of the devices herein described for any given pressure environment is directly related to the degree of flexibility of the wall portion of the capacitor which is exposed to the pressure.

The signal received by the receiver portion of unit 36 may also be used as a means to provide a time or acceleration record of the projectile where such is desired. This record is obtained by the motion of the projectile causing a frequency shift in the original transmitted signal. The amount of this shift is determined by using the following formula.

$$F = 2vf/c$$

Where:

$F$ = frequency shift or change
$v$ = velocity of the projectile
$f$ = klystron frequency
$c$ = velocity of light.

The original transmitted signal, which may be, for example 24,000 mc. has added to it the frequency shift or change F. This reflected signal (24,000 mc.+F) is mixed in the interferometer unit 45 with a portion of the original signal (24,000 mc.) and the difference signal corresponding to F is obtained. This difference signal is then applied to the display unit 42 where it may be viewed. If desired, the camera 43 may be used to permanently store the signal displayed.

Obviously the capacitance pressure gage may be used for other purposes and in different circuits and many modifications and variations of the present invention are possible in the light of the above teachings. It is therefore to be understood that within the scope of the appended claims, the invention may be practiced otherwise than as specifically described.

What is claimed and desired to be secured by Letters Patent of the United States is:

1. A system for measuring gun barrel pressure comprising: a projectile having a pressure sensitive gage located on the base thereof, the said projectile having a cavity therein, a circuit arrangement comprising an oscillator, modulator and power supply located within the cavity means connecting the gage to the oscillator so that pressure variations will cause the frequency of the oscillator to vary, a first antenna means secured to the nose of the projectile and electrically connected to the modulator, a transmitter-receiver circuit located externally of the projectile having a second antenna connected thereto, a reflector positioned to reflect signals from one antenna to the other, the first and second antennas being so located that a signal transmitted by the second antenna will be modulated and reflected back by the first antenna to the said second antenna.

2. A system according to claim 1 wherein the pressure sensitive gage is of the capacitance type comprising, a support means having a first capacitor plate secured thereto, a deformable housing means surrounding the support means and located adjacent to but separated from the capacitor plate by an electrical insulated gap, and mounting means for securing the gage to the base of the projectile.

3. A system according to claim 2 wherein the modulator is of the ferrite type located within the first antenna.

4. A system according to claim 3 wherein the first antenna is of the microwave horn type.

5. A system according to claim 4 wherein the first circuit arrangement is of the transistor type.

6. A pressure gage comprising: a deformable bell-shaped housing having a cylindrical cavity, the open end of the said housing having both the inner and outer surfaces thereof threaded, a cylindrical support means located within the cavity, the said support means having an upper portion which is of a smaller diameter than the cavity while the lower portion of the support means is threaded into engagement with the inner threaded surface of the housing, a circular capacitor cylinder secured to and electrically insulated from the support means, the said plate being separated from the inner surface of the housing means by an air gap, first electrical lead out means secured to the plate, and a second electrical lead out means secured to the housing so that pressure variations applied to the external surface of the housing will vary the spacing of the air gap and thereby cause the capacitance value appearing across the lead outs to vary.

7. A system as set forth in claim 1 wherein said pressure sensitive gage comprises a first cylindrical plug threadedly engaged with the cavity of the projectile base, said plug having an axial hole therethrough and a counterbored surface area adjacent said axial hole, a second plug having a radially extending head portion corresponding to the counterbored area of said plug, an annular recess in the inner periphery of said first plug intermediate its ends, a thin lining of electrically non-conductive cylinder carried in said recess, the inner surface of said first cylindrical plug being spaced from said second plug by an air gap, said second plug containing an axial cavity extending from its surface to a depth corresponding at least to the innermost end of said conductive cylinder, whereby pressures exerted in said cavity will deflect the walls thereof and thereby change the capacitance of said air gap.

References Cited in the file of this patent

UNITED STATES PATENTS

| | | |
|---|---|---|
| 2,250,471 | Bruin | July 29, 1941 |
| 2,367,866 | Humphreys et al. | Jan. 23, 1945 |
| 2,517,133 | Porter | Aug. 1, 1950 |
| 2,725,548 | Harris | Nov. 29, 1955 |
| 2,931,897 | Tuve et al. | Apr. 5, 1960 |
| 2,944,199 | Hudson | July 5, 1960 |
| 3,000,215 | Atanasoff et al. | Sept. 19, 1961 |
| 3,014,368 | Musser et al. | Dec. 26, 1961 |
| 3,027,769 | Coon | Apr. 3, 1962 |